United States Patent
Galasso

(10) Patent No.: US 6,936,766 B1
(45) Date of Patent: Aug. 30, 2005

(54) TWO PIECE METAL RACEWAY WITH RAISED COVER AND OFFSET DIVIDER

(75) Inventor: Marc Galasso, Beacon Falls, CT (US)

(73) Assignee: The Wiremold Company, West Hartford, CT (US)

( * ) Notice: Subject to any disclaimer, the term of this patent is extended or adjusted under 35 U.S.C. 154(b) by 0 days.

(21) Appl. No.: 10/794,171

(22) Filed: Mar. 5, 2004

(51) Int. Cl.[7] .............................................. H02G 3/04
(52) U.S. Cl. ..................... 174/48; 174/68.1; 174/97; 52/220.1; 439/211
(58) Field of Search ..................... 174/48, 68.1, 68.3, 174/49, 58, 97, 70 R; 439/211, 207; 52/220.1, 52/220.3, 220.5; 220/3.8, 4.02

(56) References Cited

U.S. PATENT DOCUMENTS

| | | | |
|---|---|---|---|
| 5,285,009 A | * | 2/1994 | Bowman et al. .............. 174/48 |
| 5,861,576 A | * | 1/1999 | Langston et al. .............. 174/48 |
| 5,942,724 A | * | 8/1999 | Russo et al. .................. 174/48 |
| 6,281,434 B1 | * | 8/2001 | Gretz ........................... 174/48 |
| 6,342,675 B1 | * | 1/2002 | DeBartolo et al. ............ 174/50 |
| 6,350,135 B1 | * | 2/2002 | Acklin et al. ................ 439/211 |
| 6,781,054 B1 | * | 8/2004 | Sullivan et al. ................ 174/48 |

* cited by examiner

Primary Examiner—Dhiru R. Patel
(74) Attorney, Agent, or Firm—McCormick, Paulding & Huber LLP

(57) ABSTRACT

A two piece metal raceway has a cross sectional area to accommodate a given cable volume, and where an outlet device is to be mounted, a raised cover affords greater depth to avoid reduction in this cross sectional area. If the raceway includes adjacent raceways separated by a divider, the raised cover requires a divider as well. However, such a divider cannot interfere with the volume required for mounting the device in the raised cover in the associated raceway. The solution disclosed provides for a unique offset divider that accommodates the device in one raceway, yet leaves sufficient space for the wiring/cabling in the adjacent raceway.

3 Claims, 2 Drawing Sheets

TWO PIECE METAL RACEWAY WITH RAISED COVER AND OFFSET DIVIDER

CROSS REFERENCE TO RELATED APPLICATIONS

U.S. Pat. No. 6,380,486 is incorporated herein by reference, and shows in greater detail the configuration of a divided raceway such as referenced herein.

SUMMARY OF INVENTION

This invention relates generally to metal raceways of the type having a base and a cover, and defining at least one and preferably two side-by-side wireways separated by a divider so as to accommodate power cables in one wireway and data communication wiring in the other, or to instead serve as separated wireways for identical cabling, or wiring that must be isolated electrically one from the other. More particularly, this invention relates to a raised device box or cover for such a two piece metal raceway, the base having a C-shaped cross section with an open side defined by inturned marginal flanges that are angled inwardly with respect to the generally parallel sidewalls of the base. Elongated raceway cover segments have rearwardly formed flanges for assembly with these base flanges, as a result of deforming the base sidewalls. The cover segments are separated to provide an opening for the raised device box or cover of the present invention. The device box itself has the same overall width as the cover segments, and end portions of the device box are identical to the spaced cover segments. However, the device box defines a rearwardly open rectangular recess, the front wall of which recess defines an opening for receiving at least one electrical device. The device box further includes tapered end portions that are joined to the short cover matched components at each end of the device box. An offset divider has a center portion designed to enlarge the cross section width of one wireway defined by the base and the device box, and this raised device box further defines a continuous cross sectional area for the other wireway as a result of the raised center portion.

DETAILED DESCRIPTION OF THE PREFERRED EMBODIMENT

Figure 1:
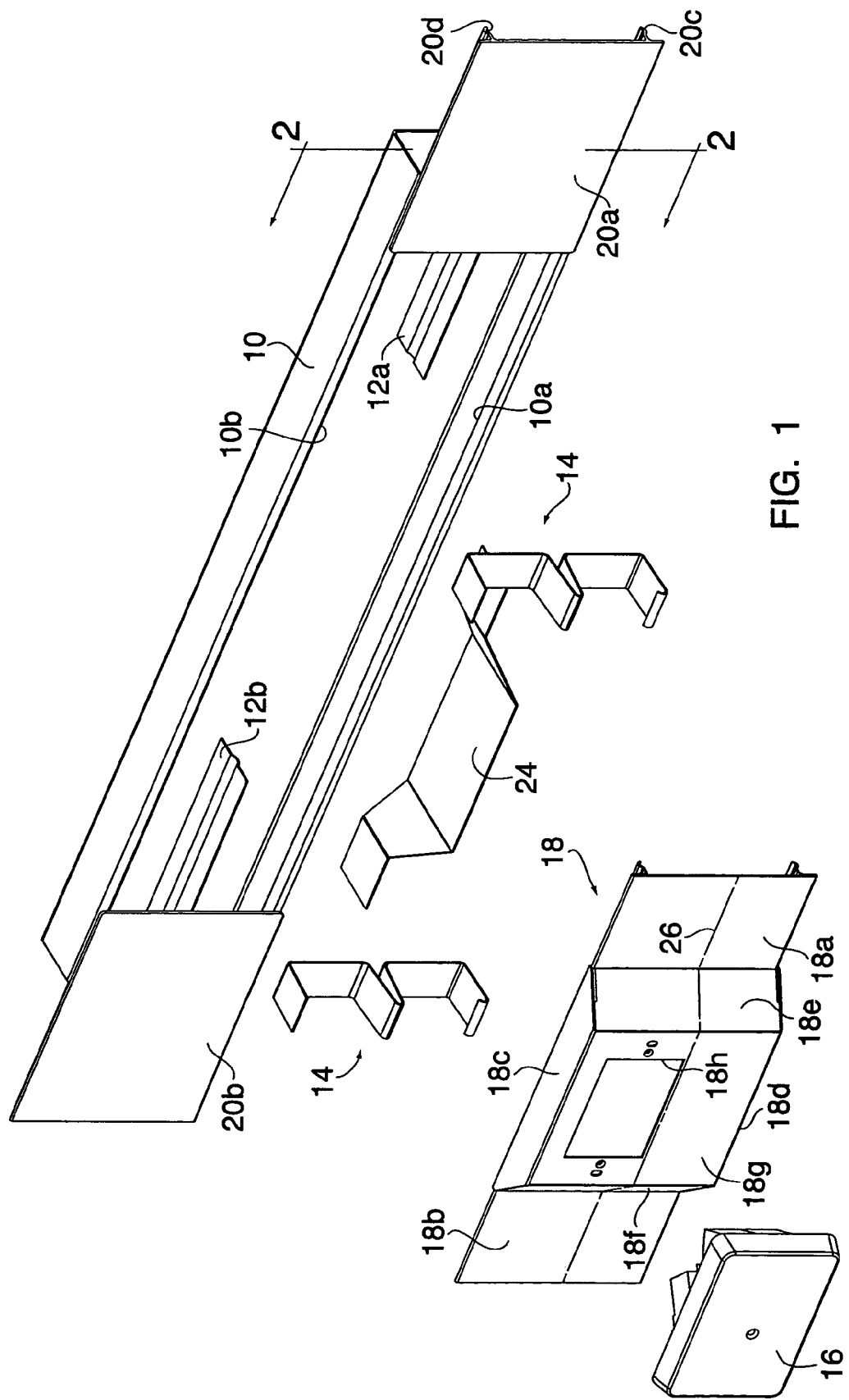
FIG. 1 is an exploded view illustrating a two piece metal raceway fitted with divider strips in accordance with the prior art, and having a raised device box/cover fitted between raceway cover segments so as to receive an outlet plug device in the form of a communication port in this case.

Turning now to the drawings in greater detail, FIG. 1 shows a two-piece metal raceway of the type adapted to receive a raised device box/cover of the present invention.

The raceway base 10 is U-shaped and fitted with a conventional divider 12a and 12b preferably mounted in the raceway base by clips such as the clips, indicated generally at 14 in FIG. 1. The reader is referred to U.S. Pat. No. 6,380,486 for a more detailed description of these clips, and the '486 patent is incorporated by reference because these style clips are also used to support an offset divider 24 to be described.

As so constructed and arranged the C-shaped raceway base 10 has inturned flanges 10a and 10b. Side by side wireways A and B of generally equal cross sectional area are defined by the base 10 for carrying power lines in one of the raceways and telecommunication wires in adjacent wireways. Preferably, and as shown, the top wireway B is provided with communication wires for transmittal of data or telephone signals, and a conventional communications device 16 is adapted to be wired from such communication wiring and provided in the upper wireway defined between the dividers 12a, 12b and the top wall of the C-shaped raceway base 10. The cover segments 20a and 20b have flanges 20c and 20d that mate with the base flanges 10a and 10b respectively.

It will be apparent that the present invention can also be adapted to support a duplex outlet device in much the same manner, that is with the lower wireway in the raceway assembly carrying the power lines that are connected to such an outlet device in a conventional manner (not shown).

In accordance with the present invention, a raised device box or cover 18 is provided so as to fit between the raceway cover segments 20a and 20b conventionally secured to the raceway base 10 as described in detail in the above-mentioned '486 patent. The raised device box/cover 18 includes end portions 18a and 18b formed similarly to the cross section or shape of the raceway cover segments 20a or 20b so as to abut these raceway cover segments in much the same manner as normally provided between adjacent raceway cover segments the two piece steel raceway of this general type.

Figure 2:
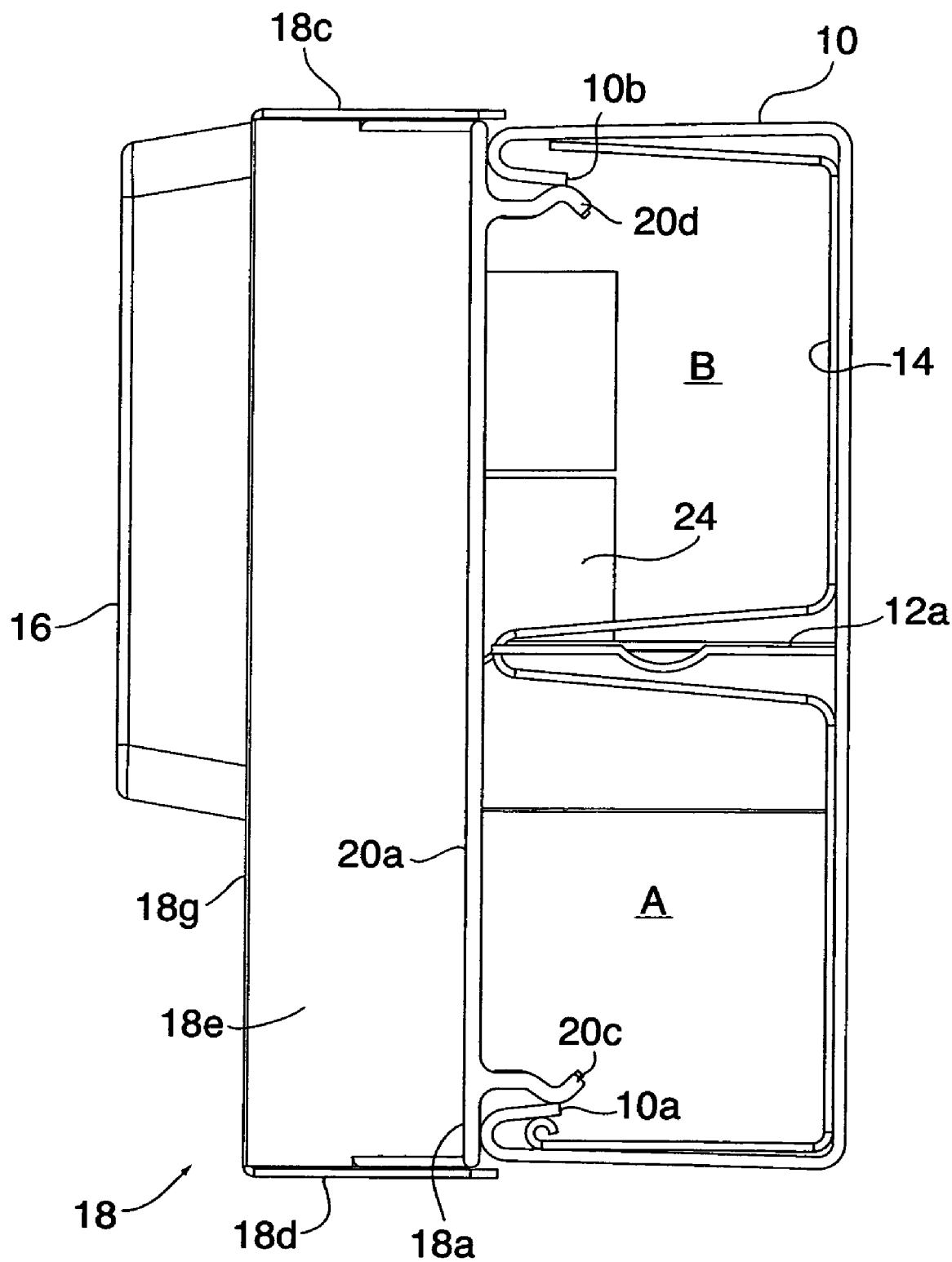
FIG. 2 is a vertical section taken generally through the assembly of FIG. 1, and illustrating the height of one raceway reduced by the presence of the outlet device, and the other raceway having a narrowed vertical dimension or width defined by the offset divider, but having an increased depth or height as a result of the raised device box/cover.

Still with reference to the raised device box/cover 18, a rearwardly open rectangularly shaped box is integrally formed with the matching cover like components 18a and 18b as shown in FIG. 1 so as to provide top and bottom walls 18c and 18d which are generally aligned with the top and bottom marginal edges of the raceway base. The rearwardly open rectangular shaped box further includes tapered end portions 18e and 18f so as to define a generally trapezoidally shaped horizontal section for the rectangular box. Finally, the box includes a front face 18g defining an opening 18h for receiving the conventional communications device 16 either by snap fitting the device 16 into said opening 18h, or by other means, such as attachments screws of the type used with electrical outlet devices generally. The opening 18h is large enough so as to overlap the normal mid location for the divider as suggested in FIG. 2. However, the raised location for the outlet device avoids any cross section reduction in the wireway. In order to make up for any reduction in wireway cross section and offset divider 24 is provided between the divider strips 12a and 12b in the raceway base 10 and is held in place by divider clips 14 and 14 utilized in a conventional fashion to support the offset divider in place (see the '486 patent referenced above). Thus, the divider 24 extends all the way from the rearwall of the raceway base 10 forwardly to the underside of the raised device box/cover 18. The divider is assembled in the raceway base 10 as suggested in FIG. 1, the forward edge of the divider will match the internal cross-sectional trapezoid shape of the raised box/cover 18 as suggested generally by the broken line 26 in FIG. 1. The offset divider 24 assures that the net cross-sectional area of both wireways is generally preserved in spite of the presence of the outlet device 16, and in spite of the fact that the width of the outlet device may be such as to require a larger opening 18h that is an opening having dimensions that exceed half the raceway base height or width (as measured between the base sidewalls).

In light of the above disclosure the invention may be practiced otherwise than this specific disclosure, and the claims appended hereto shall determine the scope of the invention.

What is claimed is:

1. In a two piece metal raceway system having an elongated base formed from flat steel stock into a C-shaped cross section with an open side defined by inturned flanges that are angled with respect to the generally parallel sidewalls of the base, and longitudinally spaced raceway cover segments for assembly with the base, the cover segments having longitudinally extending inwardly formed flanges that are adapted to be assembled with the base so that these cover segments have the same width as the base, the improvement comprising a raised device box of approximately the same width as said cover segments for placement between the spaced raceway cover segments, said device box defining a rearwardly open rectangular recess, the front wall of which defines an opening for receiving at least one electrical device, said device box further including tapered end portions joined to short cover like components of the box that are adapted to mate with said cover segments, and a divider having an offset center portion to enlarge the cross sectional width of a first of two wireways defined by said box and said base, a second of said wireways having a depth that affords substantially similar cross sectional size as said first wireway defined in the raceway base by dividers provided midway between said sidewalls of the base.

2. The raceway system according to claim 1 wherein said offset divider has end portions that match the dividers in said base.

3. The raceway system according to claim 1 wherein said offset divider has a raised center portion with an inner edge adjacent said base and an outer edge adjacent said front wall of said device box.

* * * * *